Dec. 1, 1964  R. M. WHITEHORN  3,159,797
ATOMIC FREQUENCY STANDARD
Filed June 12, 1961
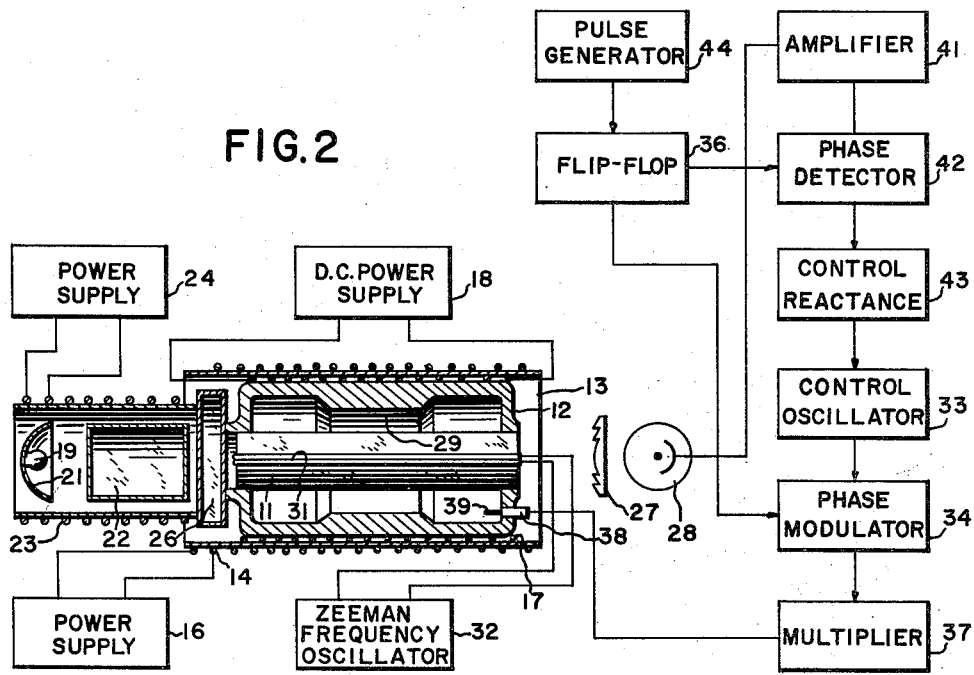
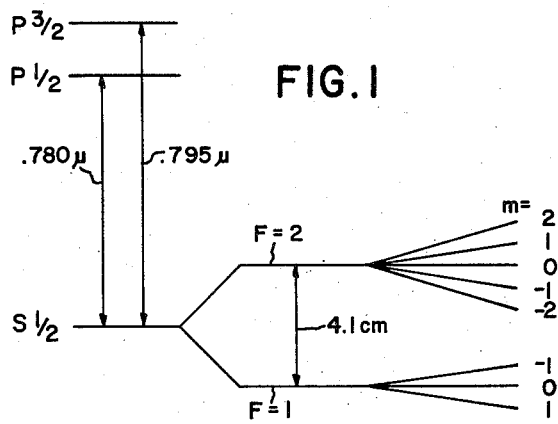
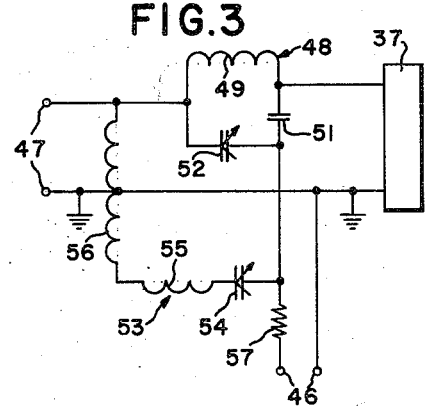
INVENTOR.
RICHARD M. WHITEHORN
BY
ATTORNEY United States Patent Office 3,159,797
Patented Dec. 1, 1964

3,159,797
ATOMIC FREQUENCY STANDARD
Richard M. Whitehorn, Menlo Park, Calif., assignor to Varian Associates, Palo Alto, Calif., a corporation of California
Filed June 12, 1961, Ser. No. 116,600
21 Claims. (Cl. 331—3)

This invention relates to frequency stabilization apparatus controlled by optical observation of field independent hyperfine transitions in alkali vapors.

U.S. patent application No. 716,571, filed on February 21, 1958, inventors being William E. Bell and Arnold L. Bloom, and assigned to the assignee of this application, teaches the fundamental principles in this art. Briefly described, a frequency stabilizer is obtained by optically "pumping" ground state alkali atoms to an optically transparent magnetic energy level according to the selection rules of quantum theory. Then, the pumped atoms are subjected to an oscillating magnetic field which, when it is oscillating at the prescribed hyperfine resonance frequency, causes some of the pumped atoms to undergo transitions to an optically opaque magnetic energy level. Optical observation of the transparency of the alkali vapor is used to determine if the frequency at which the magnetic field is oscillating is at the same value as the hyperfine resonance frequency of the alkali atoms. Although the difference between energy levels of the alkali atoms is a constant of nature and therefore the corresponding hyperfine resonant frequency is constant, there are a number of factors which are encountered in a practical apparatus which will make the hyperfine resonant frequency appear to have bandwidth or linewidth whereby the observed frequency of the oscillating magnetic field can be any value between two limits and still cause the hyperfine energy level transition.

A principal object of this invention is to provide a stabilization apparatus with improved accuracy, stability, operating convenience, and economy and reduced size.

A feature of this invention is a microwave resonator which provides maximum interaction of optical and microwave energy without seriously broadening the linewidth of the observed hyperfine resonance frequency.

Another feature of this invention is a means for adjusting the resonance of the cavity despite irregularities in the vapor cell construction without impairing the oscillating magnetic field uniformity and insuring maximum interaction between the gas in the cell and the magnetic field.

Another feature of this invention is an improved coil means for determining the value of the static magnetic field in which the cell is immersed.

Another feature of this invention is a hunting servo system which controls the output frequency of an oscillator to cause it to oscillate at a frequency which is preferably a rational fraction of the hyperfine transition frequency without systematic errors such as are produced by nonlinearities in the modulation device.

Another feature of this invention is a means to maximize the signal-to-noise ratio in a hunting servo system.

These and other objects and advantages will become apparent upon a perusal of the following specifications taken in connection with the accompanying drawing wherein:

FIG. 1 is an energy level diagram for $Rb^{87}$ in a weak magnetic field,

FIG. 2 illustrates schematically a frequency stabilization apparatus in which the microwave optical elements are shown in cross section and the balance of the circuitry is shown in block diagram, and FIG. 3 illustrates schematically an all-pass phase modulator.

The invention is explained with reference to a gas cell filled with the isotope 87 of rubidium ($Rb^{87}$) which has a hyperfine resonance frequency of 6, 834, 682, 608±7 cycles per second, between its sublevel $F=2$, $m=0$ and sublevel $F=1$, $m=0$ of the $S_{1/2}$ ground energy state. The magnetic sensitivity of this frequency is $8 \times 10^{-9}$ cycles per second per gauss square. The invention is not limited to rubidium vapors, since as taught in the above application, other alkali metals having different hyperfine resonance frequencies may be employed in its gas cell. The hyperfine structure of $Rb^{86}$ and another isotope of rubidium, $Rb^{85}$, exhibit physical properties which make these materials particularly suited to the construction of an economical, accurate frequency stabilization apparatus.

An energy level diagram for $Rb^{87}$ is shown in FIG. 1. A very similar pattern holds for all of the alkali metals. The dominant feature of the optical emission spectrum is a "D" line doublet between the $S_{1/2}$ ground state, and the $P_{1/2}$ and $P_{3/2}$ states. In a low pressure, low temperature discharge, each of the "D" lines are resolved into a hyperfine double line $F=1$ and $F=2$, split by nuclear electronic coupling in the $S_{1/2}$ ground state. Finally, there is a Zeeman splitting wherein $F=2$ splits into $m=0$, $\pm 1$, $\pm 2$ and $F=1$ splits into $m=0$, $\pm 1$.

The transition of interest for frequency control is when an atom drops from energy level of $F=2$ and $m=0$ to the energy level of $F=1$ and $m=0$, denoted as $$(F, m) = (2, 0) \rightarrow (F, m) = (1, 0)$$

transition which is equivalent to 6.8347 kmc., the hyperfine resonance frequency. Although the exact frequency is sensitive to magnetic field, the magnetic shift can be made quite small and can be determined quite accurately by simultaneous observation (described later) of the frequency corresponding to the difference in energy levels between each $m$ state and the next $m$ state within the same F sublevel which energy level is about 700 kc./gauss.

An excess population of atoms can be produced in the $F=2$ sublevel, if a $Rb^{87}$ vapor sample is illuminated with light consisting primarily of the high energy components; that is, having a wavelength corresponding to the difference in energy levels between the $F=1$ sublevel of the $S_{1/2}$ state to either one of the higher energy levels, $P_{1/2}$ or $P_{3/2}$. Absorption of such light energy produces upward transitions of atoms from the $S_{1/2}$, $F=1$ sublevel to either one of the P states, represented as $S_{1/2}$, $$F=1 \rightarrow P_{3/2}$$

and $P_{1/2}$. On re-radiation, decay occurs largely without preference as to the terminal state $S_{1/2}$. In this way, the $F=2$ sublevel population is increased at the expense of the $F=1$ sublevel population. This is the process known as "hyperfine optical pumping." A specially filtered $Rb^{87}$ light can be produced by taking advantage of the smaller hyperfine splitting and nuclear mass of the isotope $Rb^{85}$. Hyperfine splitting in $Rb^{85}$ is only about 3.5 kmc. in contrast with 6.8-kmc. figure for $Rb^{87}$, and there is a slight downward shift in energy due to the smaller reduced mass. If the $Rb^{85}$ lines are pressure broadened, a $Rb^{85}$ sample will exhibit strong selective scattering of $Rb^{87}$ light filtering out the lower energy light and allowing only the higher energy light to pump the vapor.

Referring to FIG. 2, there is shown a frequency stabilization apparatus wherein an $Rb^{87}$ sample to be examined is enclosed in a cylindrical quartz absorption cell 11 inserted in a modified $TE_{011}$ resonator 12. The resonator 12 is designed to provide a large uniphase volume of fairly uniform microwave magnetic field. This volume is occupied by the sample in cell 11. The resonator 12 is inserted in a cylindrical magnetic shield 13. A bifilar heater coil 14 disposed outside the shield 13 and coupled to a power supply 16 controls the temperature of the resonator. A magnetic coil 17 disposed within the shield and coupled to a variable D.C. power supply 18 provides a weak steady magnetic field within the shield 13 parallel to the microwave magnetic field. A filtered beam of "pumping light" is formed by passing a collimated beam of $Rb^{87}$ light from a lamp 19 and parabolic reflector 21 through a filter 22 consisting of $Rb^{85}$ and argon at a 5 cm. pressure enclosed in a quartz tube 2½ inches long. In order that the correct light energy be filtered from the $Rb^{87}$ source, the filter 22 is maintained at 67° C. by a bifilar heater coil 23 controlled by a power supply 24. A beam of light is formed which is about one quarter the initial intensity, and consists largely of the higher energy light, which causes $S_{1/2}$, $F=1 \rightarrow P_{3/2}$ or $P_{1/2}$ transitions instead of $S_{1/2}$, $F=\rightarrow P_{3/2}$ or $P_{1/2}$ transitions. The absorption cell 11 also contains a buffer gas to reduce the rate of wall collisions of the vapor. Since the temperature of the cell 11 is preferably maintained at 26° C. to minimize the frequency shift due to the buffer gas in the cell 11, a quartz vacuum cell 26 is disposed between the filter 22 and the cell 11 as a heater insulator. The filtered light then passes through the cell 11 and the transmitted light is focused by a lens 27 onto a small silicon photovoltaic cell 28. Light which is scattered by the pumping process is absorbed by a thin layer of black paint coated on the interior walls of the resonator 12.

Now, the microwave optical interaction may be considered to proceed as follows: The pumping light flux creates an excess of atoms in the $F=2$ population. When the thermal and other decay processes are in equilibrium with the pumping rate, the cell 11 will reach maximum transparency. If a microwave signal is applied to the resonator 12 at a frequency corresponding to the frequency which permits an atom to transit from the higher $F=2$ level to the lower $F=1$ by falling in a lower Zeeman level, which differs from the upper Zeeman level by zero, plus one or minus one (this transition is denoted as $\Delta F = -1$ and $\Delta m = 0, \pm 1$), downward transitions of the atoms are induced which reduce the $F=2$ to $F=1$ population imbalance and cause the pumping rate to increase. The increase in light absorption causes the intensity of the transmitted light to decrease, and the fluctuation is sensed by the photocell. The geometry shown here, namely, the weak static magnetic field, the microwave magnetic field and the light beam being substantially parallel, induces $(F, m) = (2, 0) \leftrightarrow (1, 0)$ transitions preferentially over the other $\Delta F = \pm 1$ transition.

The signal obtainable from an optically pumped vapor is known to reach a saturation point as the magnetic resonance R.F. power level is increased, due to the fact that the rate at which atoms interact with the R.F. field is then of the same order of magnitude as the relaxation rate due to other causes, thereby increasing the bandwidth of the hyperfine resonance line. The shape of the resonator 12 which is a feature of this invention maximizes the optical signal amplitude possible for a given amount of microwave power broadening of the linewidth, by providing a uniform microwave magnetic field strength over a major portion of the vapor sample volume rather than concentrating the field in the equatorial plane of the cavity as would be the case in a resonator having a uniform inner diameter, straight wall, cylindrical cavity. In a straight wall cylindrical resonator when oscillating in the $TE_{011}$ mode the axial magnetic field distribution is a half sinusoid with zero values at the end walls of the resonator so that an optimum R.F. level can be achieved only over a limited volume in the cavity. The cavity of this invention has modified the sinusoidal magnetic field distribution by reducing the diameter of the cavity in its equatorial portion 29. The wave impedance of the equatorial portion of the resonator 12 is increased thereby reducing the ratio of magnetic to electric field strength in this region so that instead of the sinusoidal distribution a flat topped or even double peaked distribution may be produced. Such a field produces a larger total interaction over the cell 11 volume for a given peak field strength than is possible with a straight wall cylindrical resonator.

Quartz tubing, which is used to form the absorption cell 11, cannot be manufactured economically to close electrical and mechanical tolerances. As the walls of the absorption cell are located in regions of high electric field these variations produce serious changes in the resonant frequency of the resonator 12. The classical technique for tuning a $TE_{011}$ resonator is to have movable end walls and move the end walls axially. Since a change in the thickness of the tubing changes not only the resonator guide wavelength but the ratio of wave impedances of the end and equatorial portions, a resonator which is tuned by moveable end walls results in a strongly peaked or doubled humped field distribution. The reduced diameter of equatorial portion 29 in the resonator 12 provides the feature wherein the adjustment of resonator frequency is made by gradually increasing the diameter of the equatorial portion 29 until resonance at the proper frequency is achieved. This can be done by simply boring the inner diameter of the portion 29 within a lathe. This process simultaneously adjusts guide wavelength and the ratio of wave impedances so that over a wide range of quartz tubing thicknesses, resonance and proper field distribution are achieved coincidentally.

In order for a frequency stabilizer of this type to operate in a precise and stable manner the static magnetic field around the absorption cell 11 is preferably maintained at a low and precisely known value. In order to do this, the value of the magnetic field must be determined. Since, as mentioned above, the $(F, m) = (2, 0) \leftrightarrow (1, 0)$ transitions are more common, the microwave interaction with the pumped vapor sample reduces the population of the $(F, m) = (2, 0)$ relative to the other sublevels in the $F=2$ level and increases the population of the $(F, m) = (1, 0)$ level relative to the other sublevels in $F=1$ level. If an alternating transverse magnetic field at a frequency corresponding to a $\Delta m = \pm 1$, $F=0$ Zeeman transition ($\approx 700$ kc./per gauss) is applied to the absorption cell 11, the sublevel populations will be re-distributed and a large net change in absorption will be observed by the photocell. An efficient $\Delta m = \pm 1$, $F=0$ Zeeman transition is performed in the present circuit by applying an alternating current to an elongated coil 31 disposed on the exterior surface of the absorption cell 11 to provide a large volume of interaction with the field produced by the coil. The side wires of this coil 31 inside the microwave resonator 12 are paraxial with the axis of symmetry of the resonator while the short end wires cross the axis whereby they have no influence on the microwave field. A variable oscillator 32 supplies power to coil 31, and observation of the $\Delta m = \pm 1$ Zeeman resonance frequency in the photocell circuit provides the information, as mentioned above, by which the current in the static field biasing coil 17 can be adjusted to produce a weak precisely known static magnetic field. As an additional feature of the resonance produced by the coil 31 a net transfer of atoms to the (2, 0) and (1, 0) sublevels may be noted to thereby enhance the detected hyperfine resonance frequency.

Now that the signal hyperfine resonance frequency of $Rb^{87}$ may be precisely determined since the static magnetic field is now known, the output frequency of an oscillator 33, such a crystal controlled oscillator, may be controlled to some convenient rational fraction of the hyperfine resonance frequency optically by simple frequency multiplier and divider circuits. The oscillations from the oscillator 33 to be controlled are applied to a phase modulator 34 controlled by a bi-stable flip-flop circuit 36. The phase modulated oscillations are multiplied in frequency by a suitable rational fraction, $p/q$, where $p$ is the hyperfine resonance frequency and $q$ is preferably a value less than the hyperfine frequency, by a multiplier 37 and applied to the absorption cell 11 through a coaxial cable 38 that is coupled to the resonator 12 with a coupling loop 39. The plane of the loop 39 is normal to a radial line extending from the axis of the resonator 12 and passing through the center of the loop 39. The resonator can now resonate in the $TE_{011}$ mode at its resonance frequency. The phase modulation of the frequency causes the intensity of the light received by the photocell 28 to fluctuate. If the controlled oscillator operates at exactly $q/p$ of the hyperfine transition frequency the fundamental period of this fluctuation will be half the flip-flop period, but if the output frequency of the controlled oscillator deviates from the value of $q/p$ of the hyperfine transition frequency, a fluctuation at the flip-flop period will appear whose phase sense and magnitude are proportional to the amplitude of the frequency deviation. The photocell output is amplified by the selective amplifier 41 responsive only to fluctuations with a period approximately equal to that of the flip-flop. The selective amplifier 41 output is applied to the phase detector 42. The phase detector output, which may be a voltage, current, or mechanical displacement having a magnitude proportional to the amplitude of the signal from the amplifier 41, and a sign which depends on whether the phase of the signal from amplifier 41 is in or out of phase in the flip-flop phase. The signal from the phase detector 42 operates a control reactance 43 coupled to the control oscillator 33 so as to restore it to exactly oscillate at the value which is $q/p$ of the hyperfine frequency.

The construction of so-called "hunting servos," of which this system is a special example, is an established art. The improvements represented by the features of this invention are the elimination of systematic error and means of maximizing the sensitivity of the system. Specifically, normal practice would be to employ a sinusoidal modulation of oscillation phase to sense and eliminate frequency deviation of the controlled oscillator. Any departure from exact symmetry in the wave form of such a modulation will cause the photocell output to contain a frequency component with the period of the modulation and thus when the output frequency of the photocell appears to have the oscillator 33 on a frequency which has a ratio of $q/p$ of the hyperfine frequency, the oscillator will actually be oscillating slightly off frequency thereby producing a systematic error.

In the subject system, the symmetry of the phase modulation employed is guaranteed by controlling the phase modulator 34 with the output of the bi-stable flip-flop circuit 36 triggered by a uniform pulse train generated by generator 44. The two halves of the flip-flop output are therefore of identical duration and two different constant voltages. According to a further feature of this invention, the square wave form is applied directly to the all-pass phase modulator 34 shown schematically in FIG. 3. The R.F. output to the resonator 12 consists of alternating intervals of two constant phases of equal duration.

The square wave generated by the flip-flop circuit is applied to terminals 46 while the output from oscillator 33 is applied to terminals 47, one of each pair of terminals being grounded. A series arm is formed by the resonant circuit 48 consisting of inductor 49 in parallel with the voltage variable capacitor 52. A blocking capacitor 51 is also included. A shunt arm is formed by the resonant circuit 53 consisting of inductor 55 in series with voltage variable capacitor 54. Symmetrical drive is provided by a bifilar transformer 56 having a grounded center tap. As is well known such a circuit can be proportioned so as to be matched and pass all frequencies, introducing only a change in phase. Variation of the voltage applied to identical capacitors 52 and 54 will cause symmetrical phase modulation without amplitude modulation. Since the applied voltage is a square wave the nonlinearity of the capacitors 52 and 54 is of no importance.

As in most electronic systems, the signal-to-noise ratio must be as large as possible so that better accuracy and efficiency is obtained. As mentioned above, a square wave modulation cycle does eliminate the systematic error produced by a non-symmetrical wave form but there are limits on the value of the modulation phase angle so that the signal-to-noise ratio is maintained at an acceptable value. Although it has been discovered that the optimum phase angle to produce the optimum signal-to-noise ratio should be 157°, it has been observed that the signal-to-noise ratio is within acceptable limits if the phase angle is maintained between 90° and 165°. Also the optimum modulation frequency should be at about 1.0177 $\Delta f$ where $\Delta f$ is the half power bandwith (as linewidth) of the resonance but it has been determined that the modulation frequency can be maintained at a value between $.8\Delta f$ and $1.2\Delta f$ and the signal-to-noise ratio will be maintained within acceptable limits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency stabilization apparatus including a light source, a light absorption cell enclosed within a cavity resonator, a light intensity means for detecting the intensity of light after passing through said cell, an oscillator for generating a radio frequency, which induces atomic resonance in said cell, a modulator means for phase modulating said radio frequency as a square wave function, and a phase detector means responsive to said light intensity means and to said modulator means for tuning said oscillator relative to the light intensity detected by said light intensity means.

2. The apparatus of claim 1 wherein said modulator means modulates said frequency through a peak to peak modulation angle between 90° and 165°.

3. The apparatus of claim 1 wherein the modulation frequency at which said modulator means modulates the phase of said R.F. frequency is equal to a value between $.8\Delta f$ and $1.2\Delta f$ where $\Delta f$ represents the half power bandwidth of said resonance.

4. The apparatus of claim 1 wherein said modulator means modulates the phase of said R.F. frequency as a square wave function having a peak to peak modulation angle between 90° and 165°, and having a modulation frequency equal to a value between $.8\Delta f$ and $1.2\Delta f$ where $\Delta f$ represents the half power bandwidth of said resonance.

5. A frequency stabilization apparatus including a light source for directing light into an absorption cell disposed within a cavity resonator, said cavity resonator comprising a cylindrical chamber having axially aligned apertures, and means for flattening the peak of the half sinusoidal wave shape of the magnetic field when said resonator is oscillating in the $TE_{011}$ mode.

6. The frequency standard of claim 5 wherein said means comprises a coaxial cylindrical inner wall portion disposed within said resonator spaced from the ends, said portion having an inner diameter smaller than the diameter of the cylindrical inner wall sections disposed one on each side of said portion.

7. A frequency stabilization apparatus including a light source directing light through an absorption cell which is axially disposed within a cylindrical cavity resonator, means for generating an external steady magnetic field directed axially through said absorption cell, and means for forming and varying the frequency of an alternating magnetic field directed transversely to said external magnetic field for including Zeeman transitions in said absorption cell, said means comprising an elongated magnetic coil disposed around the exterior surface of said cell with the long wires of said coil disposed parallel to the axis of said cavity resonator.

8. A frequency stabilization apparatus including a light source, a light absorption cell enclosed within a cavity resonator, a light intensity means for detecting the intensity of light after passing through said cell, an oscillator for generating a radio frequency, a modulator means for phase modulating said radio frequency, as a square wave function, and a phase detector means coupled to said light intensity means and to said oscillator for tuning said oscillator relative to the light intensity detected by said light intensity means, means for controlling the strength of and aligning an external steady magnetic field with said light beam passing through said cell, and means for forming and varying the frequency of alternating magnetic field disposed transversely to said external magnetic field, said cavity resonator comprising a cylindrical chamber having small aligned apertures, and means for flattening the peak of the half sinusoidal wave shape of the magnetic field when said resonator is oscillating in the $TE_{011}$ mode.

9. The apparatus of claim 8 wherein said modulator means modulates the phase of said R.F. frequency as a square wave function having a peak to peak modulation angle between 90° and 165°, and having a modulation frequency equal to a value between $.8\Delta f$ and $1.2\Delta f$ where $\Delta f$ represents the half power bandwidth of the resonance of said absorption cell.

10. The apparatus of claim 8 wherein said means comprises a coaxial cylindrical inner wall portion disposed within said resonator spaced from the ends, said portion having an inner diameter smaller than the diameter of the cylindrical inner wall sections disposed one on each side of said portion.

11. The apparatus of claim 8 wherein, the modulation frequency at which said modulator means modulates the phase of said R.F. frequency is equal to a value between $.8\Delta f$ and $1.2\Delta f$ where $\Delta f$ represents the half power bandwidth of the resonance of said absorption cell.

12. The apparatus of claim 8 wherein said modulator means modulates said frequency through a peak to peak modulation angle between 90° and 165°.

13. A frequency stabilization apparatus including a light source, a filter, a light absorption cell enclosed within a cavity resonator, a photocell disposed in line with said light source and said absorption cell, an oscillator for generating a radio frequency, a pulse generator for generating pulses at uniform time intervals, a flip-flop circuit that produces a low frequency which is controlled by said pulse generator, a phase modulation means operated by said flip-flop circuit for phase modulating said radio frequency, coupling means for coupling the phase modulated radio frequency into said resonator, an amplifier coupled to the output of said photocell for selective amplifying a low frequency which is equal to the low frequency of said flip-flop circuit, phase detector means for detecting the phase of said low frequency received from said amplifier in relation to the phase of the low frequency received from said flip-flop and for tuning said oscillator in relation to the phase between both said low frequencies.

14. A frequency stabilization apparatus including a light source, a filter, first means for maintaining said light source and filter at a constant temperature, a light absorption cell enclosed within a cavity resonator, second means for maintaining said absorption cell at a constant temperature which is different than the temperature at which the light source and filter are maintained, a transparent heat insulator disposed between said first and second means, a photocell disposed in line with said light source and said absorption cell, an oscillator for generating a radio frequency, a pulse generator for generating pulses at uniform time intervals, a flip-flop circuit that produces a low frequency which is controlled by said pulse generator, a phase modulation means operated by said flip-flop circuit for phase modulating said radio frequency, coupling means for coupling the phase modulated radio frequency into said resonator, an amplifier coupled to the output of said photocell for selective amplifying a low frequency which is equal to the low frequency of said flip-flop circuit, phase detector means for detecting the phase of said low frequency received from said amplifier in relation to the phase of the low frequency received from said flip-flop and for tuning said oscillator in relation to the phase between both said low frequencies.

15. The frequency stabilization apparatus of claim 14 wherein said phase modulation means comprises a first resonant circuit including a first inductance and a first voltage variable capacitor connected in series between said oscillator and said resonator, a transformer coil connected across the output of said oscillator with one end of said transformer coil connected to the terminal to which said first resonant circuit is disposed and the midpoint of said transformer coil connected to the other terminal, a second resonant circuit including a second inductance and a second voltage variable capacitor connected in series and said second resonant circuit connected in series between the other end of said transformer coil and the output terminal of said flip-flop circuit and being also connected in parallel with said resonator.

16. The frequency stabilization apparatus of claim 14 wherein said modulator means modulates said frequency through a peak to peak modulation angle between 90° and 165°.

17. The apparatus of claim 14 wherein the modulation frequency at which said modulator means modulates the phase of said R.F. frequency is equal to a value between $.8\Delta f$ and $1.2\Delta f$ where $\Delta f$ represents the half power bandwidth of the resonance of said absorption cell.

18. The apparatus of claim 17 wherein said modulator means modulates said frequency through a peak to peak modulation angle between 90° and 165°.

19. The apparatus of claim 14 wherein said cavity resonator includes means for flattening the peak of the half sinusoidal wave shape of the magnetic field when said resonator is oscillating in the $TE_{011}$ mode.

20. An atomic frequency standard comprising: an atomic resonance medium; means generating a radio frequency output for inducing resonance of said medium; means for phase modulating said radio frequency output; means for detecting variations in the resonance of said medium which occur at the frequency of said phase modulation; a phase detector responsive to said detected resonance variations and said modulating means for generating a control signal which stabilizes said radio frequency generator to the resonance frequency of said atomic resonance medium; and a square wave generator for controlling the symmetry of said phase modulation, thereby substantially eliminating any error in said control signal due to asymmetry of the modulation function.

21. An atomic frequency standard according to claim 20 wherein said square wave generator comprises a pulse generator for generating pulses at uniform time intervals, and a flip-flop circuit which is triggered by said pulses.

References Cited in the file of this patent
UNITED STATES PATENTS
2,951,992    Arditi _____ Sept. 6, 1960

UNITED STATES PATENT OFFICE
CERTIFICATE OF CORRECTION

Patent No. 3,159,797 December 1, 1964

Richard M. Whitehorn

It is hereby certified that error appears in the above numbered patent requiring correction and that the said Letters Patent should read as corrected below.

Column 2, line 11, for "$Rb^{86}$" read -- $Rb^{87}$ --; line 55, for "$Bb^{87}$" read -- $Rb^{87}$ --; line 57, for "$Bb^{85}$" read -- $Rb^{85}$ --; column 6, line 16, for "as" read -- or --; line 74, for "including" read -- inducing --.

Signed and sealed this 22nd day of June 1965.

(SEAL)
Attest:

ERNEST W. SWIDER
Attesting Officer

EDWARD J. BRENNER
Commissioner of Patents